United States Patent [19]

Bahl et al.

[11] Patent Number: 4,692,496

[45] Date of Patent: * Sep. 8, 1987

[54] FILMS OF LLDPE, PP AND EPR HAVING IMPROVED STIFFNESS, TEAR AND IMPACT STRENGTH

[75] Inventors: Surinder K. Bahl, Chandigarh, India; Peter J. Canterino, Towaco; Richard G. Shaw, Piscataway, both of N.J.

[73] Assignee: Mobil Oil Corporation, New York, N.Y.

[*] Notice: The portion of the term of this patent subsequent to Jan. 21, 2003 has been disclaimed.

[21] Appl. No.: 821,086

[22] Filed: Jan. 21, 1986

Related U.S. Application Data

[63] Continuation-in-part of Ser. No. 568,014, Jan. 4, 1984, Pat. No. 4,565,847.

[51] Int. Cl.$^4$ .................. C08L 23/18; C08L 23/16; C08L 23/12
[52] U.S. Cl. .................................................. 525/240
[58] Field of Search ................................ 525/240, 211

[56] References Cited

U.S. PATENT DOCUMENTS 4,565,847  1/1986  Bahl et al. ...................... 525/240

FOREIGN PATENT DOCUMENTS 52556  5/1982  European Pat. Off. ........... 525/240
58-101135A  6/1983  Japan ............................. 525/240

Primary Examiner—Carman J. Seccuro
Attorney, Agent, or Firm—Alexander J. McKillop; Michael G. Gilman; Edward J. Trojnar

[57] ABSTRACT

Polymeric blends comprising linear low density polyethylene (LLDPE) as the major constituent (60 percent or more), and polypropylene (PP) or ethylene-propylene copolymer having a high propylene content and ethylene-propylene rubber as minor constituents exhibit improved stiffness, tear and impact strength compared to blends of LLDPE and PP. The blends are suitable for use in the films.

9 Claims, No Drawings

FILMS OF LLDPE, PP AND EPR HAVING IMPROVED STIFFNESS, TEAR AND IMPACT STRENGTH

CROSS REFERENCE TO RELATED APPLICATIONS

This application is a continuation-in-part of U.S. application Ser. No. 568,016, filed Jan. 4, 1984, now U.S. Pat. No. 4,565,847, which is incorporated herein by reference in entirety.

BACKGROUND OF THE INVENTION

It is known that blends of linear low polyethylene (LLDPE) and polypropylene (PP) have improved stiffness (higher modulus) than LLDPE alone. Such blends exhibit a catastrophic decrease in impact and in tear strength, particularly in the machine direction (MD). We have found that LLDPE/PP blends containing minor amounts of an ethylene-propylene rubber (EPR) have the expected increase in stiffness along with unexpectedly improved MD Elmendorf tear and dart drop impact properties.

BRIEF DESCRIPTION OF THE INVENTION

This invention relates to thermoplastic polymer blends comprising linear low density poyethylene (LLDPE), sufficient polypropylene (PP) to improve the stiffness (modulus) of the LLPDE and a small amount of ethylene-propylene rubber (EPR) sufficient to improve the tear strength and dart drop of the LLDPE/PP blend by at least 10 percent.

DETAILED DESCRIPTION OF THE INVENTION

The thermoplastic blends of this invention generally comprise 60 to 95 weight percent of a linear low density copolymer of ethylene and an olefin having 4 to 10 carbon atoms (LLDPE); 2 to 30 weight percent of polypropylene (PP); and less than 2 weight percent of an ethylenepropylene rubber (EPR) in an amount sufficient to improve the tear strength and the dart drop impact of the LLDPE/PP blend by at least 10 percent.

The amount of polypropylene is selected to achieve the desired stiffness (modulus) and the amount can vary somewhat depending on the alpha-olefin comonomer used to prepare the LLDPE, the melt index of the LLDPE and other factors.

Similarly, the amount of EPR is selected to achieve the desired improvement in tear and impact strength and can vary depending on the nature of the LLDPE and the proportion of PP.

Preferred compositions comprise 85 to 95 weight percent of LLDPE; 5 to 15 weight percent PP; and 0.1 to 1.5 weight percent of EPR.

The blends of this invention can be physical blends of pellets of the separate ingredient or melt blends. The blends in either case are intended to ultimate formation into articles such as films having the improved tear strength and impact strength which we have discovered.

The term linear low density polyethylene (LLDPE) as used herein refers to copolymers of ethylene and an alpha-olefin having 4 to 10 carbon atoms. Representative alpha-olefins include butene, hexene and octene. Generally, the LLDPE contains up to about 10 weight percent of polymerized alpha-olefin, has a density of 0.9 to 0.94 and a melt index of 0.2 to 10. The presentation of LLDPE is described in U.S. Pat. No. 4,076,698 which is incorporated herein by reference. LLDPE is also commercially available.

The ethylene-propylene rubber (EPR) component is a copolymer containing ethylene and propylene in the backbone. Suitable EPR polymers are commercially available and are generally described in Kirk-Othmer, *Encyclopedia of Chemical Technology*, Third Edition, Volume 8, pp. 492–499, 1979. Generally, the EPR polymers contain about 50:50 to 75:25 weight ratio of ethylene to propylene. A suitable EPR is available from Exxon as Vistalon 719.

The polypropylene (PP) referred to herein includes any of the known homopolymers polymers of this class, as well as ethylene-propylene copolymers having a high propylene content which is generally above 90 weight percent. Ethylene-propylene copolymers with a propylene content of about 97 weight have been found to be suitable, many of which are commercially available. The polypropylene homopolymer or copolymer is selected for its ability to impart stiffness to the blend as shown by increased secant modulus. Accordingly, ethylene-propylene copolymers having a sufficient propylene content to impart the desired stiffness are useful in this invention.

The invention is illustrated by the following non-limiting examples.

EXAMPLES 1–2

Three blown films 7 mil (0.18 mm) thick were produced from the following compositions:

| Example 1 | LLDPE (Union Carbide HS 7064) | 85% |
| | PP | 13.5% |
| | Ethylene-propylene rubber (EPR) | 1.5% |
| Example 2 | LLDPE (Unlon Carbide HS 7068) | 85% |
| | PP | 13.5% |
| | EPR | 1.5% |
| Comparative Example | LLDPE (Unifos 8141) | 100% |

The LLDPE materials were ethylene/hexene copolymers having densities of 0.927 (HS 7064), 0.919 (HS 7068) and 0.933 (Unifos 8141). The PP and EPR was added as a preblend of PP with about 10% EPR as supplied by Eastman as type P 7673-780A.

The properties of the resultant films are given in the Table below.

TABLE

| | Example 1 | Example 2 | Comparative Example |
|---|---|---|---|
| Secant Modulus psi (kPa × 10$^3$) | MD 67,500 (465) | 50,700 (356) | 61,000 |
| | TD 64,700 (446) | 45,200 (312) | 63,000 |
| Elmendorf tear (g) | MD 1,830 | >3,200 | 1,300 |
| | TD 1,610 | >3,200 | >3,200 |
| Dart Drop (g) | >800 | >800 | 630 |

Although the present invention has been described with preferred embodiments, it is to be understood that modifications and variations can be resorted to without departing from the spirit and scope of this invention as those skilled in the art will readily understand. Such variations and modifications are considered to be within the purview and scope of the appended claims.

We claim:

1. A film of thermoplastic blend comprising:

60 to 95 weight percent of a linear low density copolymer of ethylene and an olefin having 4 to 10 carbon atoms (LLDPE);

2 to 30 weight percent of a propylene polymer selected from the group consisting of polypropylene (PP) or propylene-ethylene copolymer with a high propylene content; and less than 2 weight percent of a ethylene-propylene rubber (EPR) in an amount sufficient to improve the MD tear strength and the dart drop impact strength of the LLDPE/PP blend by at least 10 percent.

2. The film of claim 1 in which said olefin is a butene.

3. The film of claim 1 in which said olefin is hexene.

4. The film of claim 1 in which said olefin is octene.

5. The film of claim 1 comprising:
85 to 95 weight percent of LLDPE;
5 to 15 weight percent of PP; and
0.1 to 1.5 weight percent of EPR 6. The film of claim 1 in which said propylene polymer is polypropylene.

7. The film of claim 2 in which said propylene polymer is polypropylene.

8. The film of claim 3 in which said propylene polymer is polypropylene.

9. The film of claim 4 in which said propylene polymer is polypropylene.

* * * * *